(12) United States Patent
Jun

(10) Patent No.: US 8,804,055 B2
(45) Date of Patent: Aug. 12, 2014

(54) TOUCH SCREEN PANEL AND FABRICATING METHOD THEREOF

(75) Inventor: Woo-Sik Jun, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 440 days.

(21) Appl. No.: 12/952,671

(22) Filed: Nov. 23, 2010

(65) Prior Publication Data

US 2011/0205168 A1  Aug. 25, 2011

(30) Foreign Application Priority Data

Feb. 22, 2010  (KR) .................. 10-2010-0015702

(51) Int. Cl.
*G02F 1/1335* (2006.01)
*G02F 1/1343* (2006.01)

(52) U.S. Cl.
USPC .............................. 349/12; 349/139; 345/174

(58) Field of Classification Search
USPC ...................................... 349/12; 345/173, 174
See application file for complete search history.

(56) References Cited

U.S. PATENT DOCUMENTS

| 2008/0110858 | A1  |  5/2008 | Itoh et al. |           |
|--------------|-----|---------|-------------|-----------|
| 2009/0085885 | A1* |  4/2009 | Wu et al.   | 345/173   |
| 2009/0262096 | A1* | 10/2009 | Teramoto    | 345/174   |
| 2010/0026661 | A1* |  2/2010 | Teramoto    | 345/174   |
| 2010/0295819 | A1* | 11/2010 | Ozeki et al.| 345/174   |
| 2011/0157086 | A1* |  6/2011 | Ozeki et al.| 345/174   |
| 2011/0207055 | A1  |  8/2011 | Jun et al.  |           |

FOREIGN PATENT DOCUMENTS

| JP | 2008-147613     |  6/2008 |
|----|-----------------|---------|
| JP | 2008-310551     | 12/2008 |
| JP | 2009-086383     |  4/2009 |
| JP | 2009-265748     | 11/2009 |
| JP | 2010-033478     |  2/2010 |
| JP | 2010-271796     | 12/2010 |
| JP | 2011-086084     |  4/2011 |
| JP | 2011-170830     |  9/2011 |
| KR | 10-2008-0058862 |  6/2008 |
| KR | 10-2009-0024451 |  3/2009 |

OTHER PUBLICATIONS

KIPO Office Action dated Jun. 29, 2011 for Korean priority patent application 10-2010-0015702, noting the listed references in this IDS, 1 page.
JPO Decision of Grant dated Apr. 8, 2014, for corresponding Japanese Patent application 2010195492, (3 pages).

* cited by examiner

*Primary Examiner* — Richard Kim
*Assistant Examiner* — David Chung
(74) *Attorney, Agent, or Firm* — Christie, Parker & Hale, LLP

(57) ABSTRACT

A fabricating method of a touch screen panel, a transparent electrode layer and an insulating layer which are sequentially formed on a same surface of a transparent substrate. The transparent electrode layer and the insulating layer are co-patterned using a halftone mask to form a plurality of first sensing patterns connected along a first direction, a plurality of second sensing patterns having separated patterns between the first sensing patterns, and the insulating layer positioned on the first and second sensing patterns to expose regions of the second sensing patterns. A conductive layer is formed on the transparent substrate on which the first and second sensing patterns and the insulating layer are formed. The conductive layer is patterned to form second connection patterns allowing the second sensing patterns to be connected along a second direction through the exposed regions of the second sensing patterns.

18 Claims, 4 Drawing Sheets

TOUCH SCREEN PANEL AND FABRICATING METHOD THEREOF

CROSS-REFERENCE TO RELATED APPLICATION

This application claims the benefit of Korean Patent Application No. 10-2010-0015702, filed Feb. 22, 2010, in the Korean Intellectual Property Office, the disclosure of which is incorporated herein by reference.

BACKGROUND

1. Field

Aspects of the present invention relate to a touch screen panel provided to an image display device and the like, and a fabricating method thereof.

2. Description of the Related Art

A touch screen panel is an input device that allows a user's instruction to be inputted by selecting an instruction content displayed on a screen such as an image display device with a user's hand or object.

To this end, the touch screen panel is formed on a front face of the image display device to convert a contact position into an electrical signal. Here, the user's hand or object is directly in contact with the touch screen panel at the contact position. Accordingly, the instruction content selected at the contact position is inputted as an input signal to the image display device.

Since such a touch screen panel can be used instead of a separate input device connected to an image display device, such as a keyboard or mouse, use of the touch screen panel has increased. Touch screen panels are divided into a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing pattern and an adjacent sensing pattern, ground electrode or the like, when a user's hand or object is in contact with the touch screen panel.

To this end, the capacitive touch screen panel includes first sensing patterns formed to be connected along a first direction and second sensing patterns formed to be connected along a second direction, so that a coordinate of a contact position of the user's hand or object can be detected. The first and second sensing patterns are formed of the same material and in the same layer so that the touch screen panel can have more uniform sensitivity.

However, in this case, first connection patterns connecting the first sensing patterns in the first direction and second connection patterns connecting the second sensing patterns in the second direction are formed through different processes so as to prevent the first and second connection patterns from being short-circuited. For example, the first connection patterns are integrally formed with the first sensing patterns at the same time in a process of patterning the first and second sensing patterns, and the second connection patterns are formed to connect the second sensing patterns in another process, e.g., a process of forming position detecting lines.

However mask processes are necessarily performed in a process of patterning the first and second sensing patterns and the first connection lines, a process of patterning the second connection patterns and the position detecting lines, a process of patterning an insulating layer insulating the first and second connection patterns, and in other related processes. Therefore, the fabrication process of the touch screen panel is complicated, and accordingly, the fabrication efficiency of the touch screen panel is lowered.

SUMMARY

Aspects of the present invention provide a touch screen panel and a fabricating method thereof, which can simplify processes by reducing the number of mask processes and ensure stability.

According to an aspect of the present invention, there is provided a fabricating method of a touch screen panel, which includes sequentially forming a transparent electrode layer and an insulating layer on a same surface of a transparent substrate; co-patterning the transparent electrode layer and the insulating layer using a halftone mask to form a plurality of first sensing patterns connected along a first direction, a plurality of second sensing patterns having separated patterns between the first sensing patterns, and the insulating layer positioned on the first and second sensing patterns to expose regions of the second sensing patterns; forming a conductive layer on the transparent substrate on which the first and second sensing patterns and the insulating layer are formed; and patterning the conductive layer to form second connection patterns allowing the second sensing patterns to be connected along a second direction through the exposed regions of the second sensing patterns.

According to another aspect of the present invention, the co-patterning of the transparent electrode layer and the insulating layer using the halftone mask may include forming a photoresist having a first height and a second height lower than the first height on the insulating layer using the halftone mask; removing the transparent electrode layer and the insulating layer formed at regions not below the photoresist through an etching process; removing the photoresist having the second height and the insulating layer beneath the photoresist through ashing and etching processes to expose the exposed regions of the second sensing patterns; and removing the photoresist that remains on the insulating layer through an ashing process.

According to another aspect of the present invention, the removing of the transparent electrode layer and the insulating layer, formed at the other regions except the lower portion of the photoresist, through the etching process may include removing the insulating layer through a dry etching process and then removing the transparent electrode layer through a wet etching process, wherein the transparent electrode layer is over-etched so that the side of the transparent electrode layer is positioned further inward than that of the insulating layer.

According to another aspect of the present invention, in the co-patterning of the transparent electrode layer and the insulating layer using the halftone mask, the first connection patterns allowing the first sensing patterns to be connected along the first direction may be integrally formed with the first sensing patterns.

According to another aspect of the present invention, in the patterning of the conductive layer, position detecting lines connecting the first and second sensing patterns to an external drive circuit may be simultaneously formed with the second connection patterns.

According to an aspect of the present invention, there is provided a touch screen panel including a transparent substrate; first sensing patterns formed on a surface of the transparent substrate by patterning them to be connected along a first direction by first connection patterns; second sensing patterns patterned to have separated patterns and disposed between the first sensing patterns; an insulating layer formed on the first and second sensing patterns and the first connection patterns, the insulating layer exposing regions of the second sensing patterns; and second connection patterns formed on the insulating layer, the second connection patterns allowing the second sensing patterns to be connected along a second direction through the exposed regions of the second sensing patterns, wherein the first connection patterns are over-etched so that the side of the first connection patterns is positioned further inward than that of the insulating layer.

According to another aspect of the present invention, the second connection patterns may allow the second sensing patterns to be connected along the second direction through their direct contact with the second sensing patterns.

According to another aspect of the present invention, the touch screen panel may further include position detecting lines connecting the first and second sensing patterns to an external drive circuit. The position detection lines may be formed of the same material as the second connection patterns.

As described above, according to aspects of the present invention, the transparent electrode layer and the insulating layer are co-patterned using a halftone mask, thereby forming the first and second sensing patterns and the insulating layer. Accordingly, the number of mask processes is minimized, and thus, the fabrication process is simplified. Furthermore, the transparent electrode layer is over-etched so that the side of each of the first connection patterns allowing the first sensing patterns to be connected along the first direction is positioned further inward than that of the insulating layer. Accordingly, it is possible to enhance the electrical stability of the touch screen panel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
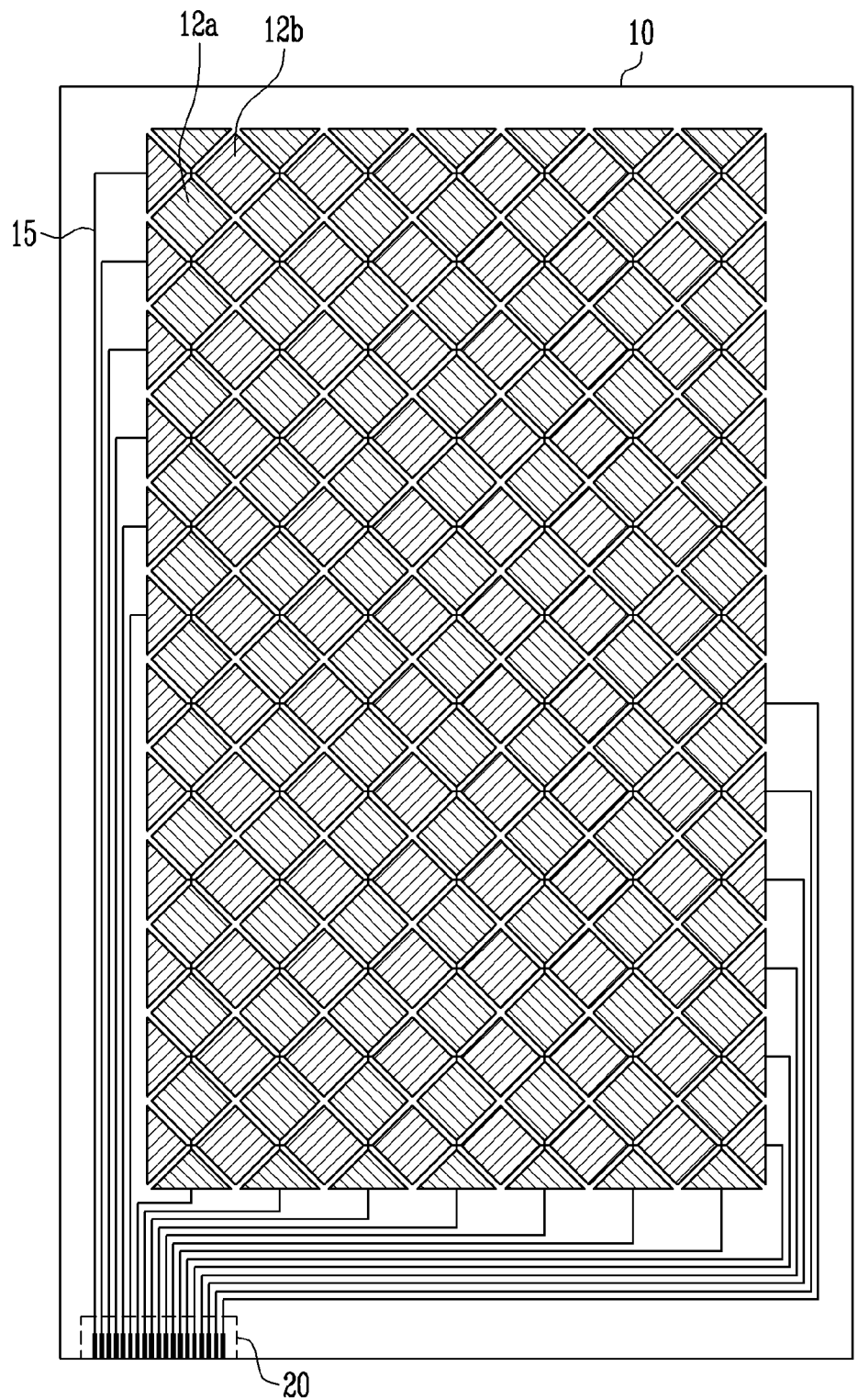
FIG. 1 is a plan view schematically showing a touch screen panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is to be understood that where is stated herein that a first element is said to be disposed or formed "on" or "in" or "connected to" a second element, the first element can directly contact the second element, or can be separated from the second element by one or more other elements located therebetween. In contrast, when an element is referred to as being disposed or formed "directly on" or "directly connected to" another element, there are no intervening elements present.

Figure 2:
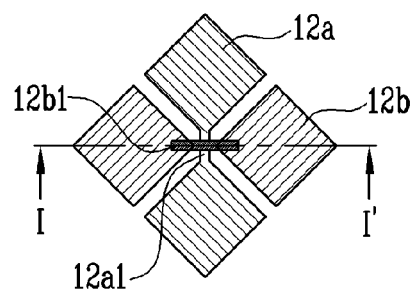
FIG. 2 is a main part plan view showing sensing patterns and connection patterns, shown in FIG. 1.

FIG. 1 is a plan view schematically showing a touch screen panel according to an embodiment of the present invention. FIG. 2 is a main part plan view showing sensing patterns and connection patterns, shown in FIG. 1. Referring to FIGS. 1 and 2, the touch screen panel, according to the present embodiment of the present invention, includes a transparent substrate 10, first sensing patterns 12a and second sensing patterns 12b formed on the transparent substrate 10. The touch screen panel also includes position detecting lines 15 connecting the first and second sensing patterns 12a and 12b to an external drive circuit (not shown) through a pad portion 20.

The first sensing patterns 12a are formed to be connected in a first direction, e.g., a column direction, using a transparent electrode material such as indium tin oxide (ITO). Thus, column lines of the first sensing patterns 12a are connected to the respective position detecting lines 15. Here, the first sensing patterns 12a are patterned to be connected along the first direction in the patterning process. For example, the first sensing patterns 12a are patterned to be connected along the first direction by first connection patterns 12a1 integrally formed as shown in FIG. 2. However, aspects of the present invention are not limited thereto and the first sensing patterns 12a may be connected along the first direction by the first connection patterns 12a1 separately formed in a different process, such as a process of forming the position detecting lines 15.

Like the first sensing patterns 12a, the second sensing patterns 12b are formed using a transparent electrode material. The second sensing patterns 12b are disposed in the same layer as the first sensing patterns 12a, and are patterned to have separated patterns between the first sensing patterns 12a. If the first and second sensing patterns 12a and 12b are positioned in the same layer, the touch screen panel can have more uniform sensitivity.

The second sensing patterns 12b are connected along a second direction different from the first direction, e.g., along a row direction, by second connection patterns 12b1 as shown in FIG. 2. Thus, row lines of the second sensing patterns 12b are connected to the respective detecting lines 15. The second connection patterns 12b1 are formed in a process different from a process of forming the second sensing patterns 12b so that the second sensing patterns 12b are connected along the second direction. For example, the second connection patterns 12b1 are formed of the same material as the position detecting lines 15 in the process of forming the position detecting lines 15 so that the second sensing patterns 12b are connected along the second direction.

The position detecting lines 15 connect the first and second sensing patterns 12a and 12b to an external drive circuit (not shown), such as a position detecting circuit, through the pad portion 20. The position detecting lines 15 are disposed outside the outline of the touch screen panel while avoiding a touch screen active area in which images are displayed. The position detecting lines 15 have a wide range of materials that may be used to form them, and therefore, may be formed of a low-resistance material such as molybdenum (Mo), silver (Ag), titanium (Ti), copper (Cu), aluminum (Al) or molybdenum/aluminum/molybdenum (Mo/Al/Mo), in addition to the transparent electrode material used in forming the first and second sensing patterns 12a and 12b. However, aspects of the present invention are not limited thereto and other suitably materials may be used to form the position detecting lines 15 and the first and second sensing patterns 12a and 12b.

The aforementioned touch screen panel is a capacitive touch screen panel. If a contact object such as a user's hand or touch stick contacts the touch screen panel, a change in capacitance based on a contact position is transferred from the sensing patterns 12a and 12b to the external drive circuit via the position detecting lines 15 and the pad portion 20. Then, the change in capacitance is converted into an electrical signal by X and Y input processing circuits (not shown) and associated elements, so that the contact position is detected.

The aforementioned touch screen panel is formed on an independent substrate to be attached to a front face of an image display device and the like, or is integrally implemented with a display panel of the image display device. For example, the touch screen panel may be integrally implemented with an organic light emitting display panel or liquid crystal display panel on a top surface of an upper substrate of the organic light emitting display panel or liquid crystal display panel. As such, the touch screen panel is integrally implemented with a display panel, thereby providing a thin image display device. However, aspects of the present invention are not limited thereto, and the aforementioned touch screen panel may be attached to or implemented in other suitable devices.

Figure 3:
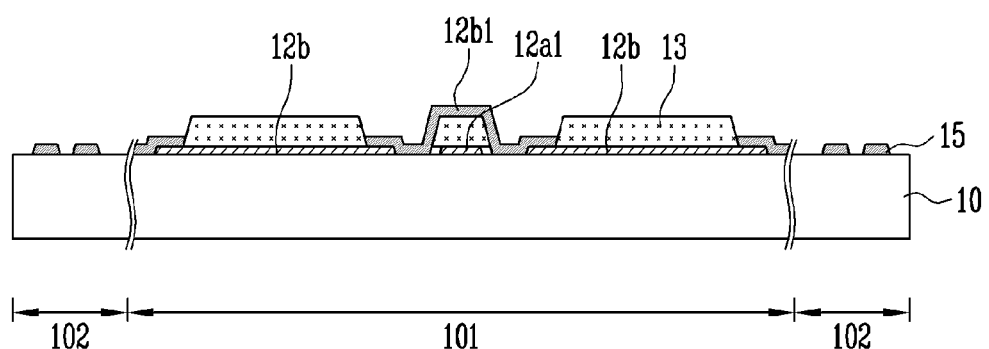
FIG. 3 is a main part plan view of a touch screen panel shown in FIG. 1.

FIG. 3 is a main part plan view of a touch screen panel shown in FIG. 1. The structure of the touch screen panel of FIG. 3 will be described in conjunction with FIGS. 1 and 2. The touch screen panel is divided into a touch screen active area formed at the central portion thereof and an interconnection area 102 formed at the periphery thereof. For convenience of illustration, in FIG. 3, the touch screen active area 101 illustrates a section taken along line I-I' of FIG. 2.

The first and second sensing patterns 12a and 12b and the first connection patterns 12a1, an insulating layer 13 and the second connection patterns 12b1 are formed in the touch screen active area 101. The first and second sensing patterns 12a and 12b and the first connection patterns 12a1 are formed on a same surface of the transparent substrate 10. The insulating layer 13 is formed on the first and second sensing patterns 12a and 12b and the first connection patterns 12a1 while exposing first regions of the second sensing patterns 12b. The second connection patterns 12b1 are formed on the insulating layer 13 to connect the second sensing patterns 12b along the second direction through the exposed regions of the second sensing patterns 12b. The position detecting lines 15 are formed in the interconnection area 102.

According to the present embodiment, the touch screen active area 101 is transparent so that light is transmittable from a display panel (not shown), or other similar light emitting devices, below the touch screen panel. The first and second sensing patterns 12a and 12b, the first connection patterns 12a1 and the insulating layer 13 are formed of a transparent material having a predetermined transmittance or higher. According to aspects of the present invention, the term "transparency" includes 100% transparency and also transparency having less than 100% transparency while having a high optical transmittance.

Thus, the first and second sensing patterns 12a and 12b and the first connection patterns 12a1 are formed of a transparent electrode material such as ITO. The insulating layer 13 is formed of a transparent insulating material such as a silicon oxide ($SiO_2$). However, aspects of the present invention are not limited thereto and the first and second sensing patterns 12a and 12b, the first connection patterns 12a1 and the insulating layer 13 may be formed of other suitable materials.

Like the position detecting lines 15, the second connection patterns 12b1 are formed of a low-resistance metal or other suitable materials. A line width or length of the second connection patterns 12b1 is adjusted, so that it is possible to prevent the second connection patterns 12b1 from being recognized by user's eyes. Although not shown in the sectional view of FIG. 3, the first sensing patterns 12a are patterned to be connected along the first direction by the first connection patterns 12a1. Thus, the first sensing patterns 12a are integrally formed with the first connection patterns 12a1 as shown in FIGS. 1 and 2.

The insulating layer 13 is formed on the first and second sensing patterns 12a and 12b and the first connection patterns 12a1. Particularly, the insulating layer 13 is interposed between the first and second connection patterns 12a1 and 12b1 at an intersection portion of the first and second connection patterns 12a1 and 12b1. Thus, the insulating layer 13 is formed so as to prevent short circuits of the first and second connection patterns 12a1 and 12b1.

According to aspects of the present invention, in order to effectively prevent the short circuits of the first and second connection patterns 12a1 and 12b1, the first connection patterns 12a1 are over-etched so that they are positioned inside the insulating layer 13, thereby increasing electrical stability. That is, the insulating layer 13 has a bottom portion formed wider than a top portion of each of the first connection patterns 12a1 at a region in which the insulating layer 13 is overlapped with each of the first connection patterns 12a1.

The insulating layer 13 exposes first regions of the second sensing patterns 12b. Therefore, the second connection patterns 12b1 allow the second sensing patterns 12b to be connected along the second direction through the exposed regions of the second sensing patterns 12b. The second connection patterns 12b1 come in direct contact with the second sensing patterns 12b through the exposed regions of the second sensing patterns 12b. Thus, the second sensing patterns 12b are connected along the second direction. The second connection patterns 12b1 are simultaneously formed using the same material as the position detecting lines 15 in the process of forming the position detecting lines 15.

However, according to aspects of the present invention, the first and second sensing patterns 12a and 12b, the first connection patterns 12a1 and the insulating layer 13 are patterned using one halftone mask. Thus, the number of mask processes is decreased and the fabrication process is simplified. This will be described in detail later with reference to FIGS. 4A to 4G.

According to aspects of the present invention, except for some regions having the second connection patterns 12b1, the insulating layer 13 is formed on a remaining entirety of the first and second sensing patterns 12a and 12b and the first connection patterns 12a1. In FIG. 3, the size of the connection patterns 12a1 and 12b1 are exaggerated as compared with that of the sensing patterns 12a and 12b for convenience of illustration. However, as shown in FIG. 1, the connection patterns 12a1 and 12b1 are practically formed to have a size to a degree at which they are difficult to be recognized.

That is, according to aspects of the present invention, most of the surface of the touch screen active area 101 is covered by the insulating layer 13. Accordingly, although a separate insulating layer is not additionally formed on the transparent substrate 10 having the second connection patterns 12b1 formed thereon, problems caused by surface scratches and the like are avoidable.

Since the second connection patterns 12b1 are positioned above the first and second sensing patterns 12a and 12b and the first connection patterns 12a1, problems caused by a step difference are avoidable. Thus, the design of the thickness of the second connection patterns 12b1 is relatively free.

FIGS. 4A to 4G are sectional views sequentially illustrating a fabricating method of the touch screen panel shown in FIG. 3. The fabricating method of the touch screen panel according to the embodiment of the present invention will be described with reference to FIGS. 4A to 4G. First, a transparent substrate 10 is prepared, and a transparent electrode layer 12' and an insulating layer 13 are sequentially grown on a same surface of the transparent substrate 10.

Figure 4A:
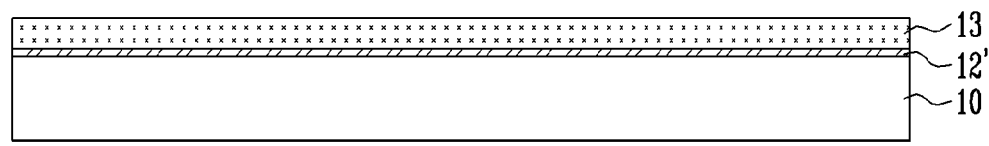
FIGS. 4A to 4G are sectional views sequentially illustrating a fabricating method of the touch screen panel shown in FIG. 3.
Figure 4B:
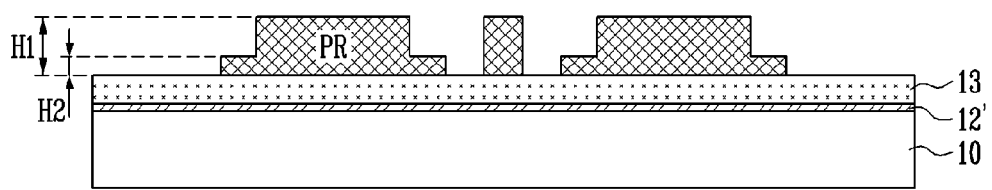

The transparent substrate 10 is an upper substrate of a display panel, a separate substrate for touch panel, a window substrate, or the like. The transparent electrode layer 12' is used to form first and second sensing patterns 12a and 12b and first connection patterns 12a1. The transparent electrode layer 12' is formed by depositing a transparent material, such as ITO, on the transparent substrate 10. Thus, the insulating layer 13 is formed by depositing a transparent insulating material such as a silicon oxide ($SiO_2$) on the transparent electrode layer 12' (FIG. 4A). However, aspects of the present invention are not limited thereto and other suitable materials may be used to form the transparent electrode layer 12' and the insulating layer 13.

Subsequently, the transparent electrode layer 12' and the insulating layer 13 are co-patterned using a halftone mask, thereby forming the first and second sensing patterns 12a and 12b, the first connection patterns 12a1 and the insulating layer 13. More specifically, with respect to FIG. 4B, a photoresist PR having different heights, i.e., a first height H1 and a second height H2 less than the first height H1, is formed on the insulating layer using one halftone mask (not shown).

The transparent electrode layer 12' and the insulating layer 13, formed at the other regions except a lower portion of the photoresist PR, are removed through an etching process. For example, the insulating layer 13 formed at the other regions except the lower portion of the photoresist PR is removed through a dry etching process. The transparent electrode layer 12' formed at the region exposed by the insulating layer 13 is then removed by further performing a wet etching process. Thus, the first and second sensing patterns 12a and 12b and the first connection patterns 12a1 are formed.

Here, although not shown in the sectional view of this figure, the first sensing patterns 12a are integrally patterned with the first connection patterns 12a1 so as to be connected along the first direction by the first connection patterns 12a1. Also, the second sensing patterns 12b are patterned to have separated patterns between respective ones of the first sensing patterns 12a. The transparent electrode layer 12' is etched only in the wet etching process. Alternatively, the transparent electrode layer 12' is partially etched in the dry etching process of the insulating layer 13 and is additionally etched in the wet etching process.

Figure 4C:
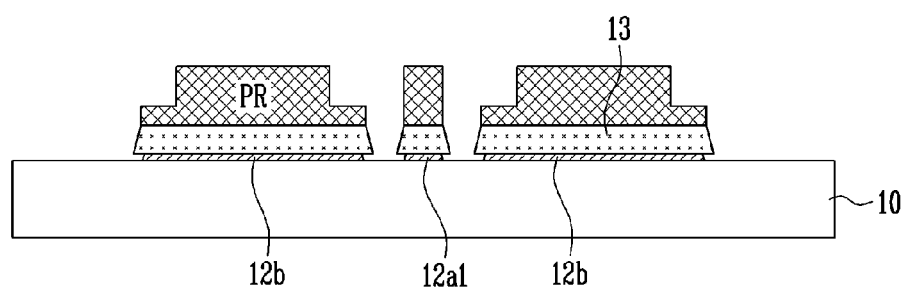

When the transparent electrode layer 12' is formed of ITO, an acid etchant such as an etchant containing oxalic acid is used as an etchant for transparent electrode material in the wet etching process of the transparent electrode layer 12'. However, aspects of the present invention are not limited thereto and other suitable etchants may be used. At this time, as illustrated in FIG. 4C, the transparent electrode layer 12' is over-etched until the side of the transparent electrode layer 12' is positioned further inward than that of the insulating layer 13, thereby ensuring the electrical stability of the touch screen panel.

Figure 4D:
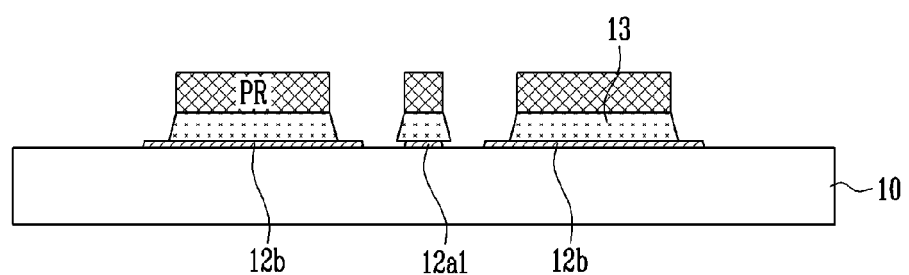

Then, the photoresist PR having the second height H2 is removed through a subsequent ashing process. At this time, an upper portion of the photoresist PR having the first height H1 is removed so that the height of the photoresist PR is lowered. The ashing process refers to a process of burning and removing a photoresist, such as photoresist PR, under a high-temperature atmosphere. The ashing process is performed in the form of a chemical reaction that promotes a pure radical reaction, excluding an ion effect. In other words, the photoresist PR is removed by forming carbon dioxide through reaction of oxygen radicals with carbon bonds of the photoresist PR. However, aspects of the present invention are not limited thereto, and the photoresist PR may be removed by other suitable processes If the photoresist PR having the second height H2 is removed, the insulating layer 13 positioned beneath the removed photoresist PR is exposed. Thus, the exposed portion of the insulating layer 13 is removed through a dry etching process or a wet etching process using a buffered oxide etchant (BOE). Accordingly, first regions of the second sensing patterns 12b are exposed. The photoresist PR having the second height H2 and the insulating layer 13 beneath the photoresist PR are removed through the ashing and etching processes. Thus, the first regions of the second sensing patterns 12b are exposed, as shown in FIG. 4D.

Figure 4E:
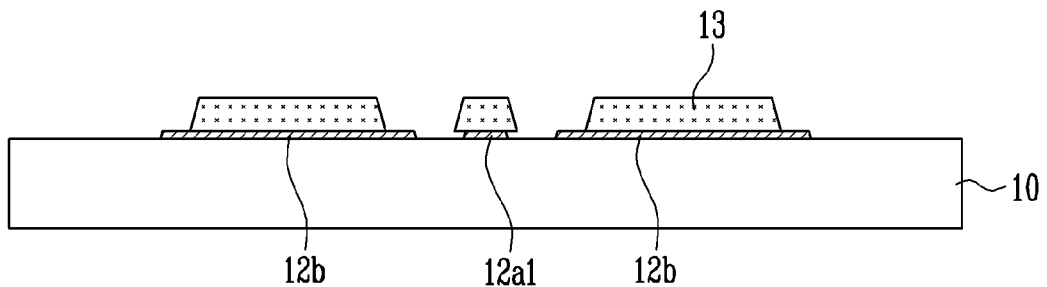
Figure 4F:
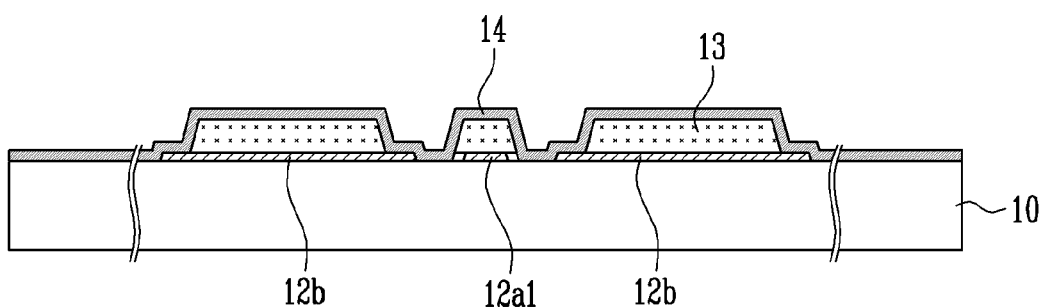

The photoresist PR that remains on the insulating layer 13 is removed through an ashing process, thereby completing the patterning process of the first and second sensing patterns 12a and 12b, the first connection patterns 12a1 and the insulating layer 13, as illustrated in FIG. 4E. Subsequently, a conductive layer 14 is entirely formed on the transparent substrate 10 on which the first and second sensing patterns 12a and 12b, the first connection patterns 12a1 and the insulating layer 13 are formed through a sputtering process or the like, as shown in FIG. 4F.

Subsequently, the conductive layer 14 is patterned using a separate mask (not shown), thereby forming second connection patterns 12b1 that allow the second sensing patterns 12b to be connected along the second direction through the exposed regions of the second sensing patterns 12b.

Figure 4G:
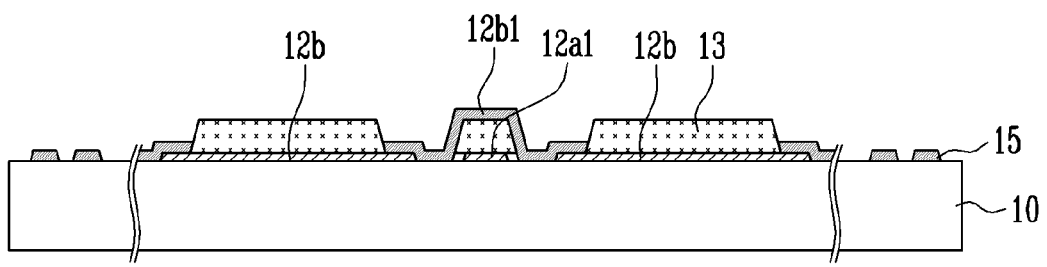

In the process of patterning the conductive layer 14, position detecting lines 15 connecting the first and second sensing patterns 12a and 12b to an external drive circuit are simultaneously formed of the same material as the second connection patterns 12b1, as shown in FIG. 4G. However, aspects of the present invention are not limited thereto, and the position detecting lines 15 may be formed at other times and of other suitable materials.

According to the fabrication method of the touch screen panel as described above, the transparent electrode layer 12' and the insulating layer 13 are co-patterned using one halftone mask, thereby forming the first and second sensing patterns 12a and 12b and the insulating layer 13. That is, the mask processes is performed in the patterning the first and second sensing patterns 12a and 12b and the insulating layer 13 using one halftone mask. Furthermore, the mask processes are performed in the patterning the second connection patterns 12b and the position detecting lines 15 using a separate mask. Accordingly, the number of mask processes is minimized, and thus, the fabrication process is simplified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fabricating method of a touch screen panel, comprising:
   sequentially forming a transparent electrode layer and an insulating layer on a same surface of a transparent substrate;

co-patterning the transparent electrode layer and the insulating layer using a halftone mask, to form a plurality of first sensing patterns connected along a first direction, a plurality of second sensing patterns having separated patterns between the first sensing patterns, and the insulating layer positioned on the first and second sensing patterns to expose regions of the second sensing patterns;

forming a conductive layer on the transparent substrate on which the first and second sensing patterns and the insulating layer are formed; and patterning the conductive layer to form second connection patterns allowing the second sensing patterns to be connected along a second direction through the exposed regions of the second sensing patterns.

2. The fabricating method according to claim 1, wherein the co-patterning of the transparent electrode layer and the insulating layer using the halftone mask comprises:

forming a photoresist having a first height and a second height lower than the first height on the insulating layer using the halftone mask;

removing the transparent electrode layer and the insulating layer formed at regions not below the photoresist through an etching process;

removing the photoresist having the second height and the insulating layer beneath the photoresist through ashing and etching processes to expose the exposed regions of the second sensing patterns; and removing the photoresist that remains on the insulating layer through an ashing process.

3. The fabricating method according to claim 2, wherein the removing of the transparent electrode layer and the insulating layer, formed at the other regions except the lower portion of the photoresist, through the etching process comprises removing the insulating layer through a dry etching process and then removing the transparent electrode layer through a wet etching process, wherein the transparent electrode layer is over-etched so that the side of the transparent electrode layer is positioned further inward than that of the insulating layer.

4. The fabricating method according to claim 1, wherein, in the co-patterning of the transparent electrode layer and the insulating layer using the halftone mask, the first connection patterns allowing the first sensing patterns to be connected along the first direction are integrally formed with the first sensing patterns.

5. The fabricating method according to claim 1, wherein, in the patterning of the conductive layer, position detecting lines connecting the first and second sensing patterns to an external drive circuit are simultaneously formed with the second connection patterns.

6. A touch screen panel comprising:

a transparent substrate;

first sensing patterns formed on a surface of the transparent substrate by patterning them to be connected along a first direction by first connection patterns;

second sensing patterns patterned to have separated patterns and disposed between the first sensing patterns;

an insulating layer formed on the first and second sensing patterns and the first connection patterns such that the first and second sensing patterns are between the insulating layer and the transparent substrate, the insulating layer exposing regions of the second sensing patterns; and second connection patterns formed on the insulating layer and having a portion contacting the substrate, the second connection patterns allowing the second sensing patterns to be connected along a second direction through the exposed regions of the second sensing patterns, wherein the first connection patterns are over-etched so that the side of the first connection patterns is positioned further inward than that of the insulating layer.

7. The touch screen panel according to claim 6, wherein the second connection patterns allow the second sensing patterns to be connected along the second direction through direct contact with the second sensing patterns.

8. The touch screen panel according to claim 6, further comprising position detecting lines connecting the first and second sensing patterns to an external drive circuit, wherein the position detecting lines are formed of the same material as the second connection patterns.

9. A touch screen panel having a transparent substrate, the touch screen panel comprising:

first sensing patterns disposed on the transparent substrate and connected along a first direction by first connection patterns;

second sensing patterns disposed on the transparent substrate and connected along a second direction by second connection patterns; and an insulating layer disposed on the first sensing patterns and the second sensing patterns and covering the first sensing patterns while exposing regions of the second sensing patterns, the first and second sensing patterns being between the insulating layer and the transparent substrate, wherein the second connection patterns connect the second sensing patterns through the exposed regions and have a portion contacting the substrate.

10. The touch screen panel of claim 9, wherein the first connection patterns are disposed below the insulating layer and the second connection patterns are disposed above the insulating layer.

11. The touch screen panel of claim 9, wherein sides of sections of the insulating layer disposed on the first sensing patterns extend past corresponding sides of the first sensing patterns.

12. The touch screen panel of claim 9, wherein the second connection patterns allow the second sensing patterns to be connected along the second direction through their direct contact with the second sensing patterns.

13. The touch screen panel of claim 9, further comprising position detecting lines connecting the first and second sensing patterns to an external drive circuit, wherein the position detecting lines are formed of the same material as the second connection patterns.

14. The touch screen panel of claim 9, wherein the first direction is perpendicular to the second direction.

15. The touch screen panel of claim 9, wherein the first sensing patterns are integrally formed with the first connection patterns.

16. The touch screen panel of claim 9, wherein the insulating layer is disposed between the first connection patterns and the second connection patterns.

17. The touch screen panel of claim 9, wherein the first sensing patterns are formed to be separated from the second sensing patterns.

18. The touch screen panel of claim 9, wherein the first sensing patterns and the second sensing patterns are each formed in a diamond shape, wherein corners of the first sensing patterns are adjacent to each other in the first direction and corners of the second sensing patterns are adjacent to each other in the second direction, and wherein columns of the first sensing patterns extending in the first direction intersect with rows of the second sensing patterns extending in the second direction.

\* \* \* \* \*